(12) United States Patent
Schulz-Sciberras et al.

(10) Patent No.: US 12,296,388 B2
(45) Date of Patent: May 13, 2025

(54) METHOD OF TREATING A GAS STREAM AND METHOD OF OPERATING AN APPARATUS FOR PRODUCING A THREE-DIMENSIONAL WORK PIECE

(71) Applicant: Nikon SLM Solutions AG, Luebeck (DE)

(72) Inventors: Matthew Schulz-Sciberras, Luebeck (DE); Patrick Sharp, Luebeck (DE); Isabell Huebinger, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 500 days.

(21) Appl. No.: 17/637,558

(22) PCT Filed: Sep. 2, 2020

(86) PCT No.: PCT/EP2020/074423
§ 371 (c)(1),
(2) Date: Feb. 23, 2022

(87) PCT Pub. No.: WO2021/043801
PCT Pub. Date: Mar. 11, 2021

(65) Prior Publication Data
US 2023/0067216 A1    Mar. 2, 2023

(30) Foreign Application Priority Data
Sep. 4, 2019   (DE) .................... 10 2019 123 637.1

(51) Int. Cl.
*B22F 10/77*   (2021.01)
*B01D 47/12*   (2006.01)
(Continued)

(52) U.S. Cl.
CPC .............. *B22F 10/77* (2021.01); *B01D 47/12* (2013.01); *B01J 19/002* (2013.01); *B22F 10/85* (2021.01);
(Continued)

(58) Field of Classification Search
None
See application file for complete search history.

(56) References Cited

U.S. PATENT DOCUMENTS 6,270,732 B1    8/2001   Gardner et al.
2005/0079018 A1*  4/2005   Volkmann ............ G01G 11/003
                                                     406/168
(Continued)

FOREIGN PATENT DOCUMENTS

CN    105382257 A    3/2016
CN    105382258 A    3/2016
(Continued)

OTHER PUBLICATIONS

Machine Translation of DE-102014207160-A1 (Year: 2015).*
(Continued)

*Primary Examiner* — Anthony M Liang
(74) *Attorney, Agent, or Firm* — Williams Mullen; Thomas F. Bergert, Esq

(57) ABSTRACT

In a method of treating a gas stream (32) containing combustible and/or reactive particles (34) at least a part of the particles (34) contained in the gas stream (32) is separated from the gas stream (32) by means of a separation device (36). The particles (34) separated from the gas stream (32) by means of the separation device (36) are supplied to a collecting vessel (40). The supply of particles (34) to the collecting vessel (40) is interrupted. A flame retardant material (57) is supplied to the collecting vessel (40) so as to form
(Continued)

a cover layer of flame retardant material (57) on the particles (34) contained in the collecting vessel (40).

12 Claims, 2 Drawing Sheets

(51) Int. Cl.
| | | |
|---|---|---|
| *B01J 19/00* | (2006.01) | |
| *B22F 10/85* | (2021.01) | |
| *B22F 12/70* | (2021.01) | |
| *B01D 46/00* | (2022.01) | |
| *B01D 46/44* | (2006.01) | |
| *B01D 46/76* | (2022.01) | |
| *B33Y 10/00* | (2015.01) | |
| *B33Y 40/00* | (2020.01) | |
| *B33Y 50/02* | (2015.01) | |

(52) U.S. Cl.
CPC .......... *B22F 12/70* (2021.01); *B01D 46/0001* (2013.01); *B01D 46/0093* (2013.01); *B01D 46/442* (2013.01); *B01D 46/76* (2022.01); *B01D 2239/0457* (2013.01); *B01D 2239/0471* (2013.01); *B22F 2999/00* (2013.01); *B33Y 10/00* (2014.12); *B33Y 40/00* (2014.12); *B33Y 50/02* (2014.12)

(56) References Cited

U.S. PATENT DOCUMENTS

| | | | |
|---|---|---|---|
| 2014/0287080 A1 | | 9/2014 | Scott et al. |
| 2016/0059310 A1 | | 3/2016 | Junker et al. |
| 2017/0361377 A1 | | 12/2017 | Guerrier et al. |
| 2018/0029122 A1 | * | 2/2018 | Nakano ................ B22F 3/1007 |

FOREIGN PATENT DOCUMENTS

| | | | | | |
|---|---|---|---|---|---|
| CN | 107848206 | | 3/2018 | | |
| CN | 207203663 U | * | 4/2018 | | |
| CN | 109414633 A | | 3/2019 | | |
| CN | 109803776 A | | 5/2019 | | |
| CN | 109874324 | | 6/2019 | | |
| CN | 109982818 | | 7/2019 | | |
| DE | 202009000825 U1 | | 3/2009 | | |
| DE | 102014207160 | | 10/2015 | | |
| DE | 102014207160 A1 | * | 10/2015 | ......... | B01D 46/0068 |
| DE | 102017207415 | | 11/2018 | | |
| EP | 3028841 | | 6/2016 | | |
| EP | 3492242 | | 6/2019 | | |
| JP | 2001017815 | | 1/2001 | | |
| JP | 2002001033 | | 1/2002 | | |
| JP | 2018015758 | | 2/2018 | | |
| JP | 2018184641 A | | 11/2018 | | |
| JP | 2019084816 A | | 6/2019 | | |

OTHER PUBLICATIONS

Machine Translation of DE-102014207160-A1 (Year: 2014).*
Machine Translation of CN-207203663-U (Year: 2018).*
China National Intellectual Property Administration, Examination Report for International Patent Application No. CN 202080062206.0, Sep. 8, 2023.
Japanese Patent Office, Office Action for JP Patent Application No. 2002-514543, Mar. 29, 2023.
China National Intellectual Property Administration, Notification to Grant for International Patent Application No. CN 202080062206.0, Jan. 9, 2024.
China National Intellectual Property Administration, Chinese Office Action for CN Patent Application No. 202080062206.0, Apr. 10, 2023.
International Preliminary Examination Report for PCT/EP2020/074423, European Patent Office, Nov. 19, 2021.
Search Report for German Application No. 10 2019 123 637.1, German Patent and Trademark Office, Jun. 16, 2020.
International Search Report and Written Opinion for PCT/EP2020/074423, European Patent Office, Nov. 20, 2020.

* cited by examiner

METHOD OF TREATING A GAS STREAM AND METHOD OF OPERATING AN APPARATUS FOR PRODUCING A THREE-DIMENSIONAL WORK PIECE

CROSS-REFERENCE TO RELATED APPLICATIONS

This application is the U.S. national phase of international application, PCT/EP2020/074423 filed on Sep. 2, 2020, which claims the benefit of German application DE 10 2019 123 637.1 filed on Sep. 4, 2019; all of which are hereby incorporated herein in their entirety by reference.

FIELD OF THE INVENTION

The invention is directed to a method of treating a gas stream containing combustible and/or reactive particles. Further, the invention is directed to a method of operating an apparatus for producing a three-dimensional work piece by irradiating layers of a raw material powder with electromagnetic or particle radiation.

BACKGROUND OF THE INVENTION

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production or repairing of prototypes, tools, replacement parts, high value components or medical prostheses, such as, for example, dental or orthopaedic prostheses, on the basis of CAD data.

An exemplary apparatus for producing three-dimensional work pieces by powder bed fusion as described, for example, in EP 2 992 942 B1 comprises a process chamber accommodating a powder application device for successively applying layers of a raw material powder onto a carrier. An irradiation unit is provided for selectively irradiating a laser beam across the raw material powder layers. The process chamber is provided with a gas inlet and a gas outlet. Via the gas inlet, a gas, for example an inert gas is supplied to the process chamber. Within the process chamber, the gas stream takes up particulate impurities such as raw material powder particles and combustion products, for example welding smoke and soot particles. The gas/particle mixture exiting the process chamber is directed through a circulation line connecting the gas outlet of the process chamber to the gas inlet of the process chamber. A cyclone and a plurality of filters which are arranged in the circulation line serve to remove the particulate impurities from the gas stream before the gas stream is recirculated into the process chamber.

SUMMARY OF THE INVENTION

It is an object of the present invention to provide a method of treating a gas stream containing combustible and/or reactive particles and a method of operating an apparatus for producing a three-dimensional work piece by irradiating layers of a raw material powder with electromagnetic or particle radiation which allow a reliable and safe handling of the combustible and/or reactive particles contained in the gas stream.

A method of treating a gas stream containing combustible and/or reactive particles comprises the step of separating at least a part of the particles contained in the gas stream from the gas stream by means of a separation device. The combustible and/or reactive particles contained in the gas stream to be treated may contain particles of a raw material powder which is processed in an apparatus for producing a three-dimensional work piece by irradiating layers of the raw material powder with electromagnetic or particle radiation. Alternatively or additionally thereto, the combustible and/or reactive particles may contain combustion products generated upon irradiating the raw material powder layers with electromagnetic or particle radiation, such as welding smoke and/or soot particles and metal condensate. Specifically, the combustible and/or reactive particles may contain particles having a particle size in the range from 1 μm to 100 μm, but may also contain agglomerates having a particle size >100 μm and particles having particle sizes <1 μm.

The separation device may comprise at least one filter and/or at least one cyclone. All that is needed is that the separation device is suitable to separate the particles contained in the gas stream from the gas stream such that a purified gas stream, i.e. a gas stream that contains less particles than the gas stream entering the separation device exits the separation device. The gas stream preferably is an inert gas stream and may contain, for example, argon or nitrogen so as to prevent an undesired oxidation of the combustible and/or reactive particles. Specifically, the gas stream may be a gas stream that is circulated through a process chamber of an apparatus for producing a three-dimensional work piece by irradiating layers of a raw material powder with electromagnetic or particle radiation in order to build up an inert gas atmosphere within the process chamber and in order to discharge particulate impurities such as raw material powder particles, welding smoke and/or soot particles from the process chamber. It is, however, also conceivable that the gas stream is a gas stream that is used in an apparatus for producing a three-dimensional work piece by irradiating layers of a raw material powder with electromagnetic or particle radiation for conveying raw material powder through a raw material powder circuit of the apparatus.

The particles that are separated from the gas stream by means of the separation device are supplied to a collecting vessel. The collecting vessel may be connected to only one component, for example to only one filter or only one cyclone of the separation device. It is, however, also conceivable that particles separated from a plurality of filters and/or cyclones are supplied to a common collecting vessel. For example, the collecting vessel may be connected to at least one filter in such a manner that particulate material that is trapped in the filter upon guiding the gas stream containing combustible and/or reactive particles through the filter is directed into the collecting vessel when the filter is periodically cleaned, for example by a "back-flush" method.

The supply of particles to the collecting vessel is interrupted. The supply of particles to the collecting vessel may be interrupted as required, i.e. at any time. The interruption of the supply of particles to the collecting vessel may, for example, be realized by automatically or manually closing a valve which may be disposed in a connecting line connecting the separation device to the collecting vessel or in in the collecting vessel. For an automatic interruption of the supply of particles to the collecting vessel, a control unit may be employed which outputs a closing signal to the valve so as to interrupt the supply of particles from the separation device to the collecting vessel via the connecting line upon receipt of a signal indicating that the filling level has reached the first predetermined value.

In particular after the interruption of the supply of particles to the collecting vessel, a flame retardant material is supplied so as to form a cover layer of flame retardant material on the particles contained in the collecting vessel. Preferably, the supply of flame retardant material is either manually or automatically controlled in such a manner that the amount of flame retardant material supplied to the collecting vessel is sufficient to form a cover layer which reliably prevents and/or controls a reaction, in particular an oxidation of the combustible and/or reactive particles contained in the collecting vessel when the collecting vessel and hence the particles are exposed to an oxidizing medium such as air or other gas mixtures, water, acid mixtures, etc., As a result, safe and reliable handling of the combustible and/or reactive particles is made possible.

Preferably, the flame retardant material may be selected and the flame retardant material may be supplied to the collecting vessel in an amount such that a diffusion of the oxidizing medium to the combustible and/or reactive particles is delayed. Thus, the rate at which the combustible and/or reactive particles are exposed to the oxidizing medium is lowered. In addition, the flame retardant material may be selected and the flame retardant material may be supplied to the collecting vessel in an amount such that reactions of the combustible and/or reactive particles e.g. with an oxidizing medium that occur despite of the presence of the cover layer are retarded or extinguished. For example, the flame retardant material may melt and encapsulate burning particles, thus shielding the particles from the oxidizing medium and extracting heat from the particles. As a result, the reaction rate is lowered and spread of the fire to the whole collecting vessel is prevented or at least retarded.

In order to form a cover layer which reliably prevents and/or controls an undesired reaction of the combustible and/or reactive particles, the flame retardant material may be supplied to the collecting vessel in an amount of at least 0.1 $g/cm^2$ of a surface area of a layer of combustible and/or reactive particles within the collecting vessel, preferably in an amount of at least 0.5 $g/cm^2$ of the surface area of a layer of combustible and/or reactive particles within the collecting vessel. The surface area of a layer of combustible and/or reactive particles within the collecting vessel typically corresponds to a cross sectional area of the collecting vessel at the level of the surface of the layer of combustible and/or reactive particles.

Basically, the flame retardant material may be supplied to the collecting vessel from an external flame retardant material source. It is, however, also conceivable to provide the collecting vessel with an internal flame retardant material container which may be disposed in an upper region of the collecting vessel and for example may be attached to a cover of the collecting vessel. The supply of flame retardant material to the collecting vessel so as to form the cover layer of flame retardant material on the particles contained in the collecting vessel then may be achieved by opening or damaging, for example puncturing the internal flame retardant material container.

In the method of treating a gas stream, a fixed amount of flame retardant material may be supplied to the collecting vessel. In this case, the amount of flame retardant material may be selected in dependence on the properties of the combustible and/or reactive particles as well as in dependence on the design and in particular the dimensions of the collecting vessel so as to allow that a cover layer of a sufficient thickness is formed on top of the particles contained in the collecting vessel and that a sufficient overall ratio of flame retardant material to combustible and/or reactive particles is obtained in the collecting vessel in order to ensure that a reaction of the combustible and/or reactive particles is reliably prevented and/or at least retarded. Preferably, the supply of flame retardant material to the collecting vessel is controlled in such a manner that a volume ratio of flame retardant material to combustible and/or reactive particles of 5:1 is obtained in the collecting vessel.

It is, however, also conceivable to control the supply of flame retardant material to the collecting vessel, in a similar manner as the supply of particles to the collecting vessel, in dependence on a filling level of the collecting vessel. For example, the supply of flame retardant material to the collecting vessel may be controlled in such a manner that the supply of flame retardant material is continued until a desired flame retardant material filling level of the collecting vessel is reached.

After supplying the flame retardant material to the collecting vessel so as to form the cover layer of flame retardant material on the combustible and/or reactive particles, the collecting vessel may be replaced by a replacement collecting vessel. For example, the collecting vessel may be decoupled from an inert gas source, e.g. an Ar source or a Nitrogen source or the collecting vessel may be decoupled from a vacuum source. Further, the collecting vessel may be detached from the connecting line and the replacement collecting vessel may be connected to the connecting line. After completion of the replacement step, the valve disposed in the connecting line or the collecting vessel may be reopened so as to allow the supply of particles from the separation device now to the replacement collecting vessel.

As described above, the supply of particles to the collecting vessel may be interrupted as required, i.e. at any time. Preferably, however, the supply of particles to the collecting vessel is interrupted at least when the filling level of the collecting vessel has reached a first predetermined value. For example, the first predetermined value may be set in such a manner, that after stopping the supply of particles to the collecting vessel, there is enough space left in the collecting vessel to allow that a cover layer of a sufficient thickness is formed on top of the particles contained in the collecting vessel and that a sufficient overall ratio of flame retardant material to combustible and/or reactive particles is obtained in the collecting vessel.

The filling level of the collecting vessel may be determined by means of at least one filling level sensor. A series of e.g. three filling level sensors which may be evenly distributed in the collecting vessel may also be employed. Additionally and/or alternatively, a scale may be used in order to determine the filling level of the collecting vessel. The at least one filling level sensor and/or the scale may be used to determine the filling level of the collecting vessel with combustible and/or reactive particles only. It is, however, also conceivable to use the at least one filling level sensor and/or the scale for determining a filling level of the collecting vessel with flame retardant material and or a mixture of flame retardant material and combustible and/or reactive particles. The filling level sensor may be designed in the form of a laser filling level sensor or an in-place sensor. The scale may be designed in the form of a three-point scale.

During the interruption of the supply of particles to the collecting vessel for supplying flame retardant material to the collecting vessel and/or for replacing the collecting vessel by the replacement collecting vessel, also the supply of the gas stream to the separation device may be interrupted. Preferably, however, the supply of the gas stream to be treated to the separation device and the step of separating at least a part of the particles contained in the gas stream from the gas stream by means of the separation device is continued during the interruption of the supply of particles to the collecting vessel. As a result, the procedural efficiency can be enhanced. The particles that are separated from the gas stream during the interruption of the supply of particles to the collecting vessel may be temporarily stored in an interim storage volume.

The Interim storage volume may be provided in the separation device. For example, particles separated from the gas stream may maintain in a filter of the separation device until the end of the interruption of the supply of particles to the collecting vessel. It is, however, also conceivable to use a separate storage tank as the interim storage volume. For example, an interim storage volume which is designed in the form of a separate storage tank may be installed in the connecting line between the separation device and the collecting vessel.

In a preferred embodiment of the method of treating a gas stream the separation device contains a flame retardant material. The flame retardant material contained in the separation device may be the same flame retardant material that is supplied to the collecting vessel so as to form the cover layer on the particles collected in the collecting vessel. It is, however, also conceivable to use a different flame retardant material in the separation device. For example, the flame retardant material may be coated onto a filter of the separation device in order to prevent undesired (oxidation) reactions of the particles within the separation device.

A filter of the separation device may, for example, be coated with the flame retardant material by spraying the flame retardant material onto the filter. In a particular preferred embodiment of the method for treating a gas stream, the flame retardant material, for coating the filter of the separation device, is introduced into the gas stream supplied to the separation device at a position upstream of the separation device. For example, a further flame retardant material source may be connected to a line flown through with the gas stream to be directed to the separation device at a position upstream of the separation device. It is, however, also conceivable that a single flame retardant material source is used for supplying flame retardant material to both the collecting vessel and the separation device. The introduction of the flame retardant material into the line flown through with the gas stream to be directed to the separation device may be controlled by a suitable control valve.

At least a part of the flame retardant material contained in the separation device may be discharged from the separation device and supplied to the collecting vessel upon cleaning a filter of the separation device. For example, at least a part of a flame retardant material which is coated onto a filter of the separation device may be removed from the filter when the filter is periodically cleaned, for example by a "back-flush" method or a vibrational motion. Consequently, particulate material that is trapped in the filter upon guiding the gas stream containing combustible and/or reactive particles through the filter and removed from the filter upon cleaning the filter is immediately diluted and/or covered with flame retardant material.

After discharging at least a part of the flame retardant material contained in the separation device from the separation device, the separation device preferably is again supplied with flame retardant material. In particular, after cleaning a filter of the separation device in order to remove trapped combustible and/or reactive particles as well as flame retardant material from the filter, the filter may be recoated with flame retardant material, for example as described above.

The particulate material and/or the flame retardant material which is removed from the filter of the separation device upon cleaning the filter may immediately be supplied to the collecting vessel. It is, however, also conceivable to temporarily store the particulate material and/or the flame retardant material in the interim storage volume of the separation device before finally supplying it to the collecting vessel, Within the collecting vessel, the flame retardant material which is removed from the filter of the separation device upon cleaning the filter and which may be mixed with a certain amount of combustible and/or reactive particles, may form an intermediate layer or at least a part of the cover layer on the particles already contained in the collecting vessel.

The flame retardant material may contain an oil based substance, a mixture of inert organic minerals or substances, calcium carbonate, sand or sodium silicate. Specifically, the flame retardant material may comprise or consist of a granulate, preferably a mineral granulate and in particular a foamed glass. The flame retardant material may contain particles having a particle size >30 μm, preferably >60 μm, and in particular >100 μm. Further, the flame retardant material may contain particles having a particle size <1 mm, preferably <500 μm, and in particular <300 μm. The particles of the flame retardant material may have a particle size in the range from 30 μm to 1 mm, in particular in the range from 60 μm to 500 μm and preferably in the range from 100 μm to 300 μm.

In dependence on the particle size distribution, a bulk density of the flame retardant material may be >50 kg/m$^3$, in particular >100 kg/m$^3$. Further, the bulk density of the flame retardant material may be <1000 kg/m$^3$, in particular <700 kg/m$^3$, The bulk density of the flame retardant material may be in the range from 50 kg/m$^3$ to 1000 kg/m$^3$, preferably in the range from 100 kg/m$^3$ to 700 kg/m$^3$. A softening and/or melting temperature of the flame retardant material may be >350° C., in particular >500° C. Further, the softening and/or melting temperature of the flame retardant material may be <1200° C., in particular <1000° C. The softening and/or melting temperature of the flame retardant material may be in the range from 350° C. to 1200° C., in particular in the range from 500° C. to 1000° C.

In the method for treating a gas stream, an operational state of the separation device may be monitored by comparing an amount of flame retardant material contained in the separation device with an amount of flame retardant material discharged from the separation device upon cleaning a filter of the separation device. For example, a specific operational state test may be performed wherein, in a first step, a defined amount of flame retardant material is supplied to the separation device and coated onto a filter of the separation device. In a second step, the flame retardant material may be removed from the separation device by cleaning the filter without previously using the filter for filtering particulate material.

The flame retardant material removed from the separation device may be supplied to the collecting vessel and the amount of flame retardant material supplied to the collecting vessel may be determined by means of the at least one filling level sensor and/or the scale. The amount of flame retardant material supplied to the collecting vessel then may be compared to the amount of flame retardant material supplied to the separation device in order to determine the operational state of the separation device and in particular of the operational state of the coating of flame retardant material applied onto a filter of the separation device.

The specific operational state test as described above may be performed prior to starting operation of the separation device, after completing operation of the separation device or during interruptions of the operation of the separation device. It is, however, also conceivable to compare a defined amount of flame retardant material supplied to the separation device and coated onto a filter of the separation device with an estimated or calculated amount of flame retardant material which is removed from the separation device and supplied to the collecting vessel by cleaning the filter of the separation device during normal operation of the separation device.

The amount of flame retardant material supplied to the collecting vessel may be calculated in case the amount of particulate material supplied to the collecting vessel during operation of the separation device is known. In case the amount of particulate material supplied to the collecting vessel during operation of the separation device is not known, the amount of flame retardant material supplied to the collecting vessel has to be estimated based on the data provided by the at least one filling level sensor and/or the scale and an estimated amount of particles supplied to the collecting vessel during operation of the separation device.

Alternatively or additionally thereto, it is also conceivable to determine an amount of particles separated from the gas stream by means of the separation device and supplied to the collecting vessel. For example, a volume and/or a mass of the content of the collecting vessel may be determined by means of the at least one filling level sensor and/or the scale and the amount of particles may be calculated by subtracting the known volume and/or mass of flame retardant material supplied to the collecting vessel from the overall value provided by the filling level sensor and/or the scale.

The method of treating a gas stream may contain the additional step of interrupting the supply of particles to the collecting vessel when the filling level of the collecting vessel has reached a second predetermined value which is smaller than the first predetermined value. Flame retardant material may then be supplied to the collecting vessel so as to form an intermediate layer of flame retardant material on the particles contained in the collecting vessel. After forming the intermediate layer of flame retardant material, the supply of particles separated from the gas stream by means of the separation device to the collecting vessel may be resumed. The formation of one or more intermediate layers of flame retardant material in the collecting vessel may in particular be considered when the gas stream to be treated contains highly combustible and/or highly reactive particles such as, for example, fine titanium particles.

In a method of operating an apparatus for producing a three-dimensional work piece by irradiating layers of a raw material powder with electromagnetic or particle radiation the gas stream is supplied to the process chamber of the apparatus. The gas stream preferably is an inert gas stream and may contain, for example, argon or nitrogen. The gas stream is directed through the process chamber in order to establish a controlled gas atmosphere, in particular a controlled inert gas atmosphere within the process chamber. While being directed through the process chamber the gas stream takes up combustible and/or reactive particles, such as, for example, raw material powder particles, welding smoke and soot particles and metal condensate. The gas stream containing the combustible and/or reactive particles is discharged from the process chamber. By keeping the gas atmosphere within the process chamber as clean as possible, shielding of a radiation beam by particulate impurities and hence reduction of irradiation efficiency is minimized. The gas stream containing the combustible and/or reactive particles is treated in accordance with the above described method.

After treating the gas stream containing the combustible and/or reactive particles so as to separate the particles from the gas stream, a purified gas stream which exits the separation device separating at least a part of the particles contained in the gas stream from the gas stream may be recirculated to the process chamber of the apparatus.

In the method of operating an apparatus for producing a three-dimensional work piece, the supply of particles to the collecting vessel may be interrupted as required, i.e. at any time and/or when the filling level of the collecting vessel has reached a first predetermined value as described above. Further, the supply of particles to the collecting vessel may be interrupted upon completion of the production of the three dimensional workpiece, i.e. upon completion of a build process for producing the three dimensional workpiece. After supplying the flame retardant material to the collecting vessel, the collecting vessel then may be replaced by a replacement collecting vessel and a subsequent build process may be started with the replacement collecting vessel in place.

Preferred embodiments of the invention will be described in greater detail with reference to the appended schematic drawings.

DETAILED DESCRIPTION OF PREFERRED EMBODIMENTS

Figure 1:
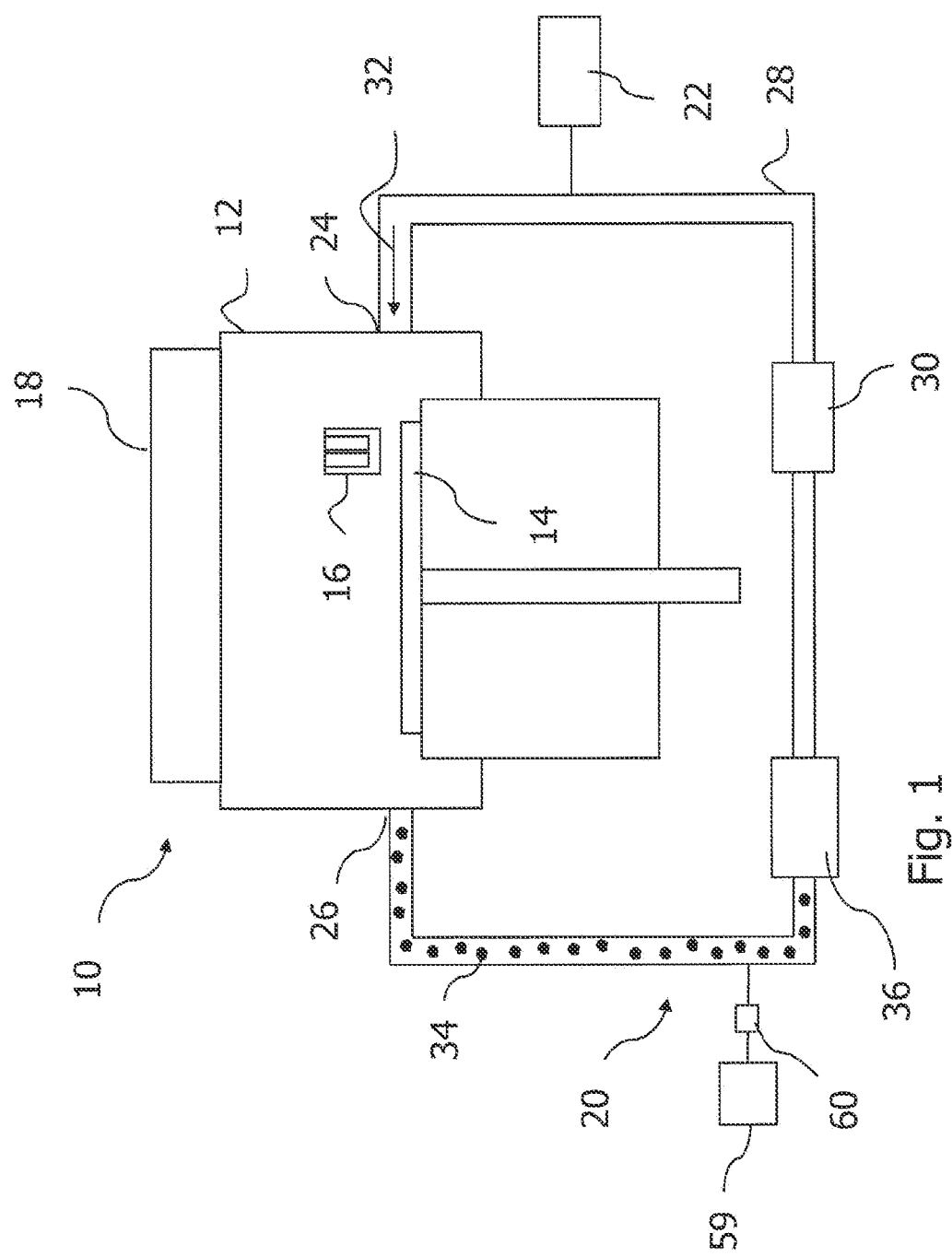
FIG. 1 shows an apparatus for producing a three-dimensional work piece by irradiating layers of a raw material powder with electromagnetic or particle radiation which is equipped with gas circuit for directing the gas stream through a process chamber of the apparatus.

FIG. 1 shows an apparatus 10 for producing a three-dimensional work piece by an additive layering process. The apparatus comprises a process chamber 12 accommodating carrier 14 and a powder application device 16 for applying a raw material powder onto the carrier 14. The process chamber 12 is sealable against the ambient atmosphere, i.e. the environment surrounding the process chamber 12. The apparatus 10 further comprises an irradiation device 18 for selectively irradiating electromagnetic or particle radiation onto the raw material powder applied onto the carrier 14.

A gas circuit 20 is provided so as to establish a controlled gas atmosphere within the process chamber 12. The gas circuit 20 contains a gas source 22. The gas source 22 in particular is designed in the form of an inert gas source, for example in the form of an argon or nitrogen source. The process chamber 12 comprises a gas inlet 24 for supplying gas to the process chamber 12. A gas outlet 26 serves to discharge gas from the process chamber 12. A circulation line 28 connects the gas outlet 26 to the gas inlet 24. Further, the circulation line 28 is connected to the gas source 22. A conveying device 30 serves to convey the gas stream through the circulation line 28.

Upon being directed through the process chamber 12, a gas stream 32 supplied to the process chamber 12 via the gas inlet 24 takes up combustible and/or reactive particles 34, such as raw material powder particles, welding smoke and/or soot particles. The gas/particle mixture exiting the process chamber 12 via the gas outlet 26 therefore is treated before being recirculated to the process chamber 12 via the circulation line 28 and the gas inlet 24. In particular, the particles 34 contained in the gas stream 32 are separated from the gas stream 32 by means of separation device 36 which is disposed in the circulation line 28 upstream of the conveying device 30. The purified gas stream 32 exiting the separation device 36 is recirculated to the process chamber 12 via the circulation line 28 and the gas inlet 24.

Figure 2:
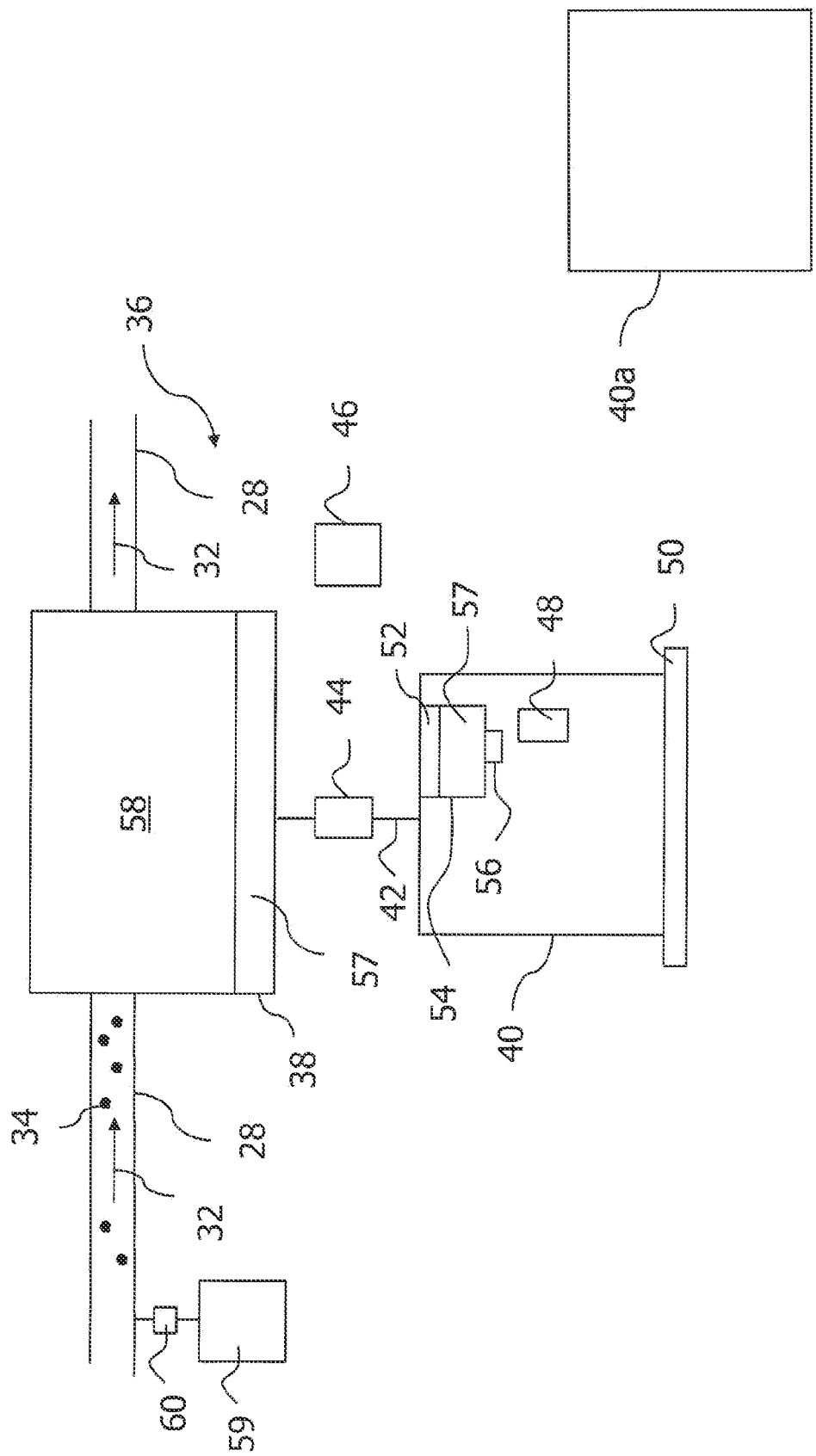
FIG. 2 shows a detailed view of a separation device disposed in the gas circuit of the apparatus according to FIG. 1.

A detailed view of the separation device 36 is shown in FIG. 2. In the embodiment shown in the drawings, the separation device 36 comprises a filter 38 for filtering the particles 34 from the gas stream 32. It is, however, also conceivable that the separation device 36 comprises a plurality of filters and/or one or more cyclone(s). In order to prevent an undesired (oxidation) reaction of the particles contained in the gas stream 32 which is directed through the filter 38, the filter 38 is coated with a flame retardant material 57. For example, the filter 38 is coated with a flame retardant material 57 with extinguishing effects as schematically indicated in FIG. 2.

The separation device 36 is connected to a collecting vessel 40 via a connecting line 42. The collecting vessel 40 serves to accommodate the particulate material 34 that is trapped in the filter 38 of the separation device 36 when the gas stream 32 is directed through the filter 38 and that is removed from the filter 38 upon continuously or periodically cleaning the filter 38, for example by inducing a vibrational motion of the filter 38. Within the collecting vessel 40, a base layer of flame retardant material 57 is provided. The flame retardant material 57 again is a flame retardant material with extinguishing effects.

The supply of particles 34 from the separation device 36 to the collecting vessel 40 is controlled by means of a valve 44 which is disposed in the connecting line 42. Operation of the valve 44 is controlled by means of an electronic control unit 46. It is, however, also conceivable that the valve 44 is designed in the form of a manually controllable valve. A filling level of the collecting vessel 40 is controlled by means of a filling level sensor 48 and a scale 50. The scale 50 is designed in the form of three-point scale, Signals that are output by the filling level sensor 48 and the scale 50 are transmitted to the electronic control unit 46.

Finally, a flame retardant material source 52 is provided. In the embodiment shown in the drawings, the flame retardant material source 52 comprises a bag 54 which contains a flame retardant material 57 and which is disposed within the collecting vessel 40. The bag 54 is attached to a cover of the collecting vessel 40 and may be punctured by means of a suitable device (not shown) so as to discharge a fixed amount of flame retardant material 57, i.e. the content of the bag 54, from the bag 54 into the interior of the collecting vessel 40. It is, however, also conceivable to equip the flame retardant material source with a further valve 56 which allows a controlled supply of flame retardant material 57 from the flame retardant material source 52 to the collecting vessel 40.

For coating the filter 38 with the flame retardant material 57, a further flame retardant material source 59 is connected to the circulation line 28 at a position upstream of the separation device 36. The supply of flame retardant material 57 from the flame retardant material source 59 to the circulation line 28 and thus into the gas stream 32 supplied to the separation device 36 via the circulation line 28 is controlled by a control valve 60. In case the filter 38 should be coated with a flame retardant material 57, the control valve 60 is opened and hence flame retardant material 57 is introduced into the gas stream 32. The flame retardant material 57 is entrained with the gas stream 32 and sprayed onto the filter 38.

In the preferred embodiment described herein, the flame retardant material 57 consists of a foamed glass which contains particles having a particle size in the range from 30 µm to 1 mm, in particular in the range from 60 µm to 500 µm and preferably in the range from 100 µm to 300 µm. A bulk density of the flame retardant material 57 is in the range from 50 kg/m$^3$ to 1000 kg/m$^3$, preferably in the range from 100 kg/m$^3$ to 700 kg/m$^3$. A softening and/or melting temperature of the flame retardant material 57 is in the range from 350° C. to 1200° C., in particular in the range from 500° C. to 1000° C.

In a method of treating a gas stream, the particles 34 that are separated from the gas stream 32 by means of the separation device 36 are supplied to the collecting vessel 40. The supply of particles 34 to the collecting vessel 40 may happen under the control of the control unit 46 and may be started by opening the valve 44, The particles 34 may be supplied to the collecting vessel 40 either continuously or periodically, while the filling level of the collecting vessel 40 is continuously monitored by means of the filling level sensor 48 and the scale 50.

The supply of particles 34 to the collecting vessel 40 may be interrupted as required at any time, e.g. upon completion of the production of the three dimensional workpiece. However, at least when the filling level of the collecting vessel 40 with particles 34 has reached a first predetermined value that is determined by means of the filling level sensor 48 and the scale 50, the supply of particles 34 to the collecting vessel 40 is Interrupted. In particular, the interaction of the supply of particles 34 to the collecting vessel 40 is achieved by closing the valve 44 under the control of the control unit 46 in response to the signals transmitted to the control unit 46 from the filling level sensor 48 and the scale 50.

Thereafter, flame retardant material 57 is supplied to the collecting vessel 40 so as to form a cover layer of flame retardant material 57 on the particles 34 contained in the collecting vessel 40. The flame retardant material 57 is introduced from the flame retardant material source 52 into the collecting vessel 40 by opening the further valve 56 so as to allow the supply of flame retardant material 57 from the bag 54 to the collecting vessel 40. When the cover layer of flame retardant material 57 in the collecting vessel 40 has reached a desired thickness and a desired volume ratio of flame retardant material 57 to combustible and/or reactive particles of e.g. 5:1 is reached in the collecting vessel 40, the supply of flame retardant material 57 to the collecting vessel 40 is interrupted by closing the further valve 56. The supply of flame retardant material 57 to the collecting vessel 40 so as to form the desired cover layer is controlled by means of the control unit 46 in dependence on signals which are indicative of the filling level of the collecting vessel 40 and which are provided to the control unit 46 from the filling level sensor 48 and the scale 50.

The cover layer prevents an uncontrolled (oxidation) reaction of the particles 34 when the collecting vessel 40, in a next step, is detached from the connecting line 42 and, due to its disconnection from the inert gas circuit 20, exposed to the ambient atmosphere or when there is a leakage in the system. The full collecting vessel 40 then is replaced by a replacement collecting vessel 40a. Specifically, the replacement collecting vessel 40a is connected to the connecting line 42 in place of the collecting vessel 40. After being disconnected from the connecting line 42, the full collecting vessel 40 may be closed by means of a cover (not shown).

In case the particles 34 contained in the gas stream 32 are highly combustible and/or reactive, the method may comprise the further optional steps of interrupting the supply of particles 34 to the collecting vessel 40 when the filling level of the collecting vessel 40 has reached a second predetermined value that is smaller than the first predetermined value. For example, the supply of particles 34 to the collecting vessel 40 may already be interrupted when the collecting vessel 40 is only filled to about 50%. Flame retardant material 57 may then be supplied to the collecting vessel 40 so as to form an intermediate layer of flame retardant material 57 on the particles 34 contained in the collecting vessel 40. After forming the intermediate layer of flame retardant material 57, the supply of particles 34 which are separated from the gas stream 32 by means of the separation device 36 may be resumed.

During the interruption of the supply of particles 34 to the collecting vessel 40, the flow of the particle loaded gas stream through the separation device 36 and the operation of the separation device 36 are continued. Thus, even during the interruption of the supply of particles 34 to the collecting vessel 40, the separation device 36 continues separating particles 34 from the gas stream 32. These particles 34 are temporarily stored in an interim storage volume 58 which may be provided in the interior of the separation device 36 as shown in the drawing or which may be provided in a separate container. In particular, the particles 34 that are separated from the gas stream 32 during the interruption of the supply of particles 34 to the collecting vessel 40 maintain in the filter 38 of the separation device 36. Hence, continuous operation of the apparatus 10 is made possible.

Upon periodically cleaning the filter 38 of the separation device 36, for example by a "back-flush" method or a vibrational motion, at least a part of the flame retardant material 57 contained in the separation device 36, i.e. at least a part of the flame retardant material 57 coated onto the filter 38 of the separation device 36 is removed from the filter 38. Consequently, the combustible and/or reactive particles 34 that are removed from the filter 38 upon cleaning the filter 38, are immediately diluted and/or covered with flame retardant material 57.

After being removed from the filter 38, the combustible and/or reactive particles 34 together with the flame retardant material 57 may immediately be supplied to the collecting vessel 40. It is, however, also conceivable to temporarily store the particulate material 34 and/or the flame retardant material 57 in the interim storage volume 58 of the separation device 36 before finally supplying it to the collecting vessel 40. Within the collecting vessel 40, the flame retardant material 57 which is removed from the filter 38 upon cleaning the filter 38 and which may be mixed with a certain amount of combustible and/or reactive particles 34, may form an intermediate layer or at least a part of the cover layer on the particles 34 already contained in the collecting vessel 40.

After discharging at least a part of the flame retardant material 57 contained in the separation device 36 from the separation device 36, the separation device 36 is again supplied with flame retardant material 57 from the further flame retardant material source 59. In particular, after cleaning the filter 38, the filter 38 is recoated with flame retardant material 57 by opening the control valve 60 and by supplying flame retardant material 57 from the further flame retardant material source 59 into the gas stream 32 as described above.

Prior to starting operation of the separation device 36, after completing operation of the separation device 36 or during interruptions of the operation of the separation device 36, a specific operational state test may be performed in order to determine the operational state of the separation device 36 and in particular the operational state of the coating of flame retardant material 57 applied onto the filter 38 of the separation device 36. This operational state test involves a comparison of an amount of flame retardant material 57 contained in the separation device 36 with an amount of flame retardant material 57 discharged from the separation device 36 upon cleaning the filter 38 of the separation device 36.

In a first step, a defined amount of flame retardant material 57 is supplied to the separation device 36 and coated onto the filter 38 of the separation device 36, for example as described above. In a second step, the flame retardant material 57 is removed from the separation device 36 by cleaning the filter 38 without previously using the filter 38 for filtering particulate material. The flame retardant material 57 removed from the separation device 36 is supplied to the collecting vessel 40 and the amount of flame retardant material 57 supplied to the collecting vessel 40 is determined by means of the filling level sensor 48 and/or the scale 50. The amount of flame retardant material 57 supplied to the collecting vessel 40 then is compared to the amount of flame retardant material 57 supplied to the separation device 36.

In case it is desired to monitor the operational state of the separation device 36 and in particular the operational state of the coating of flame retardant material 57 applied onto the filter 38 of the separation device 36 during normal operation of the separation device 36, it is also possible to compare a defined amount of flame retardant material 57 supplied to the separation device 36 and coated onto the filter 38 of the separation device 36 with an estimated or calculated amount of flame retardant material 57 which is removed from the separation device 36 and supplied to the collecting vessel 40 by cleaning the filter 38 during normal operation of the separation device 36.

In case the amount of particulate material 34 supplied to the collecting vessel 40 during operation of the separation device 36 including cleaning the filter 38 is known, the amount of flame retardant material 57 supplied to the collecting vessel 40 upon cleaning the filter 38 may be calculated. In case, however, the amount of particulate material 34 is not known, the amount of flame retardant material 57 supplied to the collecting vessel 40 still can be estimated based on the data provided by the filling level sensor 48 and/or the scale 50 and an estimated amount of particles 34 supplied to the collecting vessel 40 during operation of the separation device 36 including cleaning the filter 38.

Alternatively or additionally thereto, it is also possible to determine an amount of particles 34 separated from the gas stream 32 by means of the separation device 36 and supplied to the collecting vessel 40. For example, a volume and/or a mass of the content of the collecting vessel 40 may be determined by means of the filling level sensor 48 and/or the scale 50 and the amount of particles 34 may be calculated by subtracting the known volume and/or mass of flame retardant material 57 supplied to the collecting vessel 40 from the overall value provided by the filling level sensor 48 and/or the scale 50.

The invention claimed is:

1. A method of treating a gas stream containing combustible and/or reactive particles, the method comprising:
   separating at least a part of the particles contained in the gas stream from the gas stream by means of a separation device, wherein the separation device comprises a filter for filtering the particles from the gas stream which is directed through the filter, the filter being coated with a flame retardant material in order to prevent undesired reactions of the particles within the separation device, the flame retardant material containing particles having a particle size larger than 30 μm;
   supplying the particles separated from the gas stream by means of the filter of the separation device to a collecting vessel;
   interrupting the supply of particles to the collecting vessel; and
   supplying a flame retardant material to the collecting vessel so as to form a cover layer of flame retardant material on the particles contained in the collecting vessel.

2. The method according to claim 1, further comprising:
   after supplying the flame retardant material to the collecting vessel, replacing the collecting vessel by a replacement collecting vessel.

3. The method according to claim 1, wherein the supply of particles to the collecting vessel is interrupted at least when a filling level of the collecting vessel has reached a first predetermined value.

4. The method according to claim 3, wherein the filling level of the collecting vessel is determined by means of at least one filling level sensor and/or a scale.

5. The method according to claim 1, further comprising:
   during the interruption of the supply of particles to the collecting vessel, continuing separating at least a part of the particles contained in the gas stream from the gas stream by means of the separation device; and
   temporarily storing the particles separated from the gas stream in an interim storage volume.

6. The method according to claim 5, wherein the interim storage volume is provided in the separation device.

7. The method according to claim 1, wherein the filter of the separation device is coated with the flame retardant material by spraying the flame retardant material onto the filter, in particular wherein the flame retardant material, for coating the filter (38) of the separation device, is introduced into the gas stream supplied to the separation device at a position upstream of the separation device.

8. The method according to claim 1, wherein at least a part of the flame retardant material contained in the separation device is discharged from the separation device and supplied to the collecting vessel upon cleaning the filter of the separation device.

9. The method according to claim 3, further comprising the steps of:
   interrupting the supply of particles to the collecting vessel when the filling level of the collecting vessel has reached a second predetermined value, the second predetermined value being smaller than the first predetermined value;
   supplying a flame retardant material to the collecting vessel so as to form an intermediate layer of flame retardant material on the particles contained in the collecting vessel; and
   after forming the intermediate layer of flame retardant material, resuming the supply of particles separated from the gas stream by means of the separation device to the collecting vessel.

10. A method of operating an apparatus for producing a three-dimensional work piece by irradiating layers of a raw material powder with electromagnetic or particle radiation, the method comprising:
    supplying a gas stream to a process chamber of the apparatus;
    directing the gas stream through the process chamber, wherein the gas stream, while being directed through the process chamber takes up combustible and/or reactive particles; discharging the gas stream containing the combustible and/or reactive particles from the process chamber; and
    treating the gas stream containing the combustible and/or reactive particles in accordance with the method as defined in claim 1.

11. The method according to claim 10, further comprising:
    after treating the gas stream containing the combustible and/or reactive particles, recirculating a purified gas stream exiting the separation device separating at least a part of the particles contained in the gas stream from the gas stream to the process chamber.

12. The method according to claim 10, wherein the supply of particles to the collecting vessel is interrupted upon completion of the production of the three dimensional workpiece.

* * * * *